United States Patent Office 3,247,173
Patented Apr. 19, 1966

3,247,173
CATALYTIC POLYMERIZATION OF α-OLEFINS WITH MIXTURES OF A TITANIUM COMPOUND AND A POLYMERIC ORGANOMETALLIC REACTION PRODUCT
Newton H. Shearer, Jr., Zurich, Switzerland, and Harry W. Coover, Jr., Kingsport, Tenn., assignors to Eastman Kodak Company, Rochester, N.Y., a corporation of New Jersey
No Drawing. Filed Dec. 7, 1961, Ser. No. 157,829
20 Claims. (Cl. 260—88.2)

This application is a continuation-in-part of copending application Serial No. 549,868, filed November 29, 1955, and now abandoned.

This invention relates to a new and improved polymerization process and is particularly concerned with the use of novel catalysts for preparing high molecular weight solid poly-α-olefins of high density and crystallinity. More specifically, the invention is concerned with improved processes for polymerizing olefins such as ethylene, propylene, or mixtures thereof, to give polymers having densities much higher than those achieved by high pressure polymerization processes, without the necessity of employing extremely high temperature and pressure conditions.

The commercial polyethylene prepared by high pressure polymerization techniques, although useful for a variety of applications, has a relatively low softening temperature and is too flexible for many uses. This high pressure polyethylene is characterized by a relatively high degree of chain branching and a density which is considerably lower than the theoretical density. Usually, pressures in excess of 500 atmospheres and commonly of the order to 1000–1500 atmospheres are employed to effect the polymerization to solid polymer. Such pressures have been necessary even with the use of oxygenated catalysts such as the peroxides.

For many years, olefins have been polymerized to give low molecular weight liquid polymers. Some success has attended scattered efforts to form solid polymers at low pressures and temperatures using various catalytic materials, but the results thereby obtained by use of catalytic materials have been almost completely unpredictable. Thus, a minor change in the nature of the catalytic material often has meant the difference between obtaining a low molecular weight liquid polymer and a high molecular weight solid polymer. Furthermore, some of the catalysts which would result in formation of solid polymer, did so only at extremely high pressures and hence offered little advantage over the usual high pressure polymerization processes wherein flexible low density polymers were obtained.

This invention is concerned with and has for an object to provide improved processes whereby α-monoolefins are readily polymerized by catalytic means to give high molecular weight solid polymers of improved softening temperature, density, crystallinity and stiffness. A particular object of the invention is to provide an improved process for preparing a wide variety of poly-α-olefins at pressures ranging from atmospheric pressure up to relatively high pressures and at temperatures ranging from —60° C. to about 130° C. Another object of the invention is to provide an improved method for making polyethylene, polypropylene, or ethylene-propylene copolymers having improved characteristics.

These and other objects which will be apparent from the description and claims which follow are attained by means of the process embodying the present invention wherein α-monoolefins, either singly or in admixture, are readily polymerized to high molecular weight solid polymers by effecting the polymerization in the presence of a catalytic mixture of a compound of a transition metal and a nondistillable polymeric reaction product resulting from reaction of a methylene halide with a metal from the group consisting of aluminum, zinc and magnesium. The transition metal compound employed in the catalyst composition is a compound of a transition metal selected from the group consisting of titanium, zirconium, vanadium, chromium, molybdenum and tungsten. In these compounds the transition metal can be at its maximum valence but it is possible to employ a compound of a transition metal having a reduced valence. Among the transition metal compounds that can be used are the halides, including the oxyhalides, oxides, alkoxides and acetylacetonates of the aforementioned transition metals. For the most desirable results, the alkoxide groups contain from 1 to 12 carbon atoms. Such compounds as titanium tetrachloride, titanium trichloride, titanium dichloride, titanium ethoxide, titanium butoxide, a titanium oxide or mixture of oxides and titanium acetylacetonate can be used in the catalyst combination. Similar compounds of zirconium, vanadium, chromium, molybdenum and tungsten can also be used. For the most desirable results it is preferred to use a halide of titanium having either its maximum valency or a reduced valency and specifically it is preferred to employ either titanium tetrachloride or titanium trichloride in the catalyst composition. The polymeric reaction product forming the other component of the catalyst mixture is the nondistillable, solid product obtained by reacting a methylene halide, such as methylene bromide or chloride, with aluminum, magnesium, or zinc, and is a complex material of polymeric nature whose structure is not readily definable. The polymeric reaction product of a methylene halide and aluminum is preferred, although the other materials defined can be used with somewhat less advantageous results. The specific nature of the invention is illustrated by the fact that the combination of the transition metal compound and the polymeric reaction product readily forms solid polymers even at low temperatures and pressures whereas the individual components do not give the solid polymers desired under the same conditions. The catalysts embodying this invention can be employed over a wide range of temperatures and pressures with excellent results. It is thus apparent that the polymerization of α-olefins to form the solid high density polymers depends upon rather specific catalyst combinations as defined herein, and the reason why these combinations work and others do not is not readily understood. Particularly good results are obtained using a combination of a titanium tetrachloride, trichloride, tetrabromide or tetraalkoxide wherein each group contains 1–4 carbon atoms, with the polymeric reaction product of methylene bromide or methylene chloride with aluminum. The polymeric reaction products obtained in this manner by substituting magnesium for the aluminum also give excellent results approaching those obtained with the aluminum compounds whereas the zinc complexes are less preferably used but give highly effective results in many cases. The inventive process is carried out in liquid phase in an inert organic liquid and preferably an inert liquid hydrocarbon vehicle. The process proceeds with excellent results over a temperature range from as low as —60° C. to as high as 130° C. Ordinarily, temperatures within the range of —20° C. to 80° C. are preferred for optimum results. The pressure can be varied as desired with pressures as low as atmospheric pressure being completely operable and pressures of 100 p.s.i. or higher being desirably employed in some cases, pressures of as much as 20,000 p.s.i. or higher being desirably used in some instances. For most commercial operations, pressures of 50–700 p.s.i. are preferred and give optimum yields of desirable polymer. The liquid vehicle employed is desirably one which serves both as a liquid medium and a solvent for the solid polymerization products at the temperature of polymerization.

The invention is applicable for polymerizing any of the well known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalystic process herein described, and molecular weights even greater than 1,000,000 can be readily attained. The high molecular weight, high density polyethylenes of this invention are insoluble in solvents at ordinary temperatures but are partially soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747–50) of at least 50,000 p.s.i.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-monoolefins and particularly with propylene. Other monoolefins which are suitably employed either alone or in admixture include such materials as n-butylene, isobutylene, 1-pentene, 1-decene, and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

The improved results obtained in accordance with the invention depend upon the particular combination of catalyst materials defined herein. The polymeric reaction products are readily prepared by reacting methylene bromide, methylene chloride, or the like with desired aluminum, magnesium or zinc in the form of granules, turnings, or powder. The reaction proceeds readily with the evolution of heat to form nondistillable polymeric solids. In some cases, it is desirable to initiate the reaction by the addition of a crystal of iodine or preferably by the addition of a small amount of previously prepared polymeric reaction product. In some cases, it also assists the reaction to heat it initially on a steam bath. During the course of the reaction, it is usually desirable to control the heat of reaction by cooling the reaction mixture. When the evolution of heat has ceased, the reaction mixture can be refluxed to ensure completion. The nondistillable polymeric reaction product solidifies on cooling and can be used directly as catalyst for the polymerizations embodying the invention. The polymeric reaction product must be protected from atmospheric oxygen and moisture before and during use. The exact nature of the polymeric reaction products is not readily understood, and the invention will not be limited by any attempt to define the exact composition. The polymeric reaction product can be used in combination with one or more of the aforementioned transition metal compounds. Titanium tetrachloride, titanium tetrabromide, titanium trichloride, titanium acetylacetonate and the titanium tetraalkoxides containing 1–4 carbon atoms in each alkoxide group, such as titanium tetrabutoxide, titanium tetramethoxide, titanium tetraethoxide and the like are preferably employed although the corresponding compounds of zirconium, vanadium, chromium, molybdenum and tungsten give excellent results. Good results are also obtained using oxides of the aforementioned transition metals as exemplified by titanium dioxide, titanium sesquioxide, and mixtures thereof.

The only limitation on the temperature at which the process can be effected is the decomposition temperature of the catalyst. The pressure employed is usually only sufficient to maintain the reaction mixture in liquid form during the polymerization. The catalyst mixtures employed are readily soluble or dispersible in the organic liquid vehicles commonly employed and hence the uniformity of reaction can be readily controlled. The exact nature of the catalytic action between those components of the catalytic mixture is not understood. The extreme activity of the catalyst mixture is shown by the fact that the polymerization proceeds readily at temperatures as low as −60° C. and atmospheric pressure. The transition metal compounds, when used alone, give no solid high density polymer under any conditions. Similarly, the polymeric reaction products are ineffective as catalysts when employed without the concomitant use of a transition metal compound. The combination, however, results in polymerization to give substantial formation of polymer in periods of from a few minutes to a few hours. The polymeric organo metallic reaction products are solid at ordinary temperatures and can be either dispersed in the liquid reaction vehicle or employed at temperatures in which the catalyst is liquid or soluble in the polymerization medium. No particular activation procedures or methods of preparation are necessary in order to obtain the highly active catalyst mixtures.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from −60° C. to 130° C. can be employed as desired, the usual process adapted for commercial production is carried out at a temperature in the range of from −20° C. to 80° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 500 to 700 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 4% by weight in the vehicle. The concentration of the monomer in the vehicle will vary rather widely depending upon the reaction conditions and will usually range from about 2 to 50% by weight, or preferably from about 2 to about 10% by weight based on the weight of the vehicle. Concentrations of monomer in the vehicle of about 3–7% by weight are commonly employed. Higher concentrations of monomer ordinarily increase the rate of polymerization. Concentrations above 5–10% by weight are ordinarily less desirable because the polymer dissolved in the reaction medium results in a very viscous solution. Since the catalyst employed is soluble in the reaction medium, the deposit of polymer on the catalyst such as occurs in solid bed catalysts, is not a factor, and it is therefore not necessary to limit the conditions so that no polymer precipitates during the process.

In preparing the polymeric reaction products, the ratio of the methylene halide to the aluminum, zinc or magnesium can be varied widely, although the metal is ordinarily employed in molar excess to ensure completion of the reaction. Any unused metal can be readily separated from the molten polymeric reaction product. The molar ratio of the polymeric organo metallic reaction product to the transition metal compound can be varied rather widely within the range of from 1:4 to 16:1. Excellent results are obtained with approximately equal weights of the two components of the catalyst mixture or with a slight excess by weight of the transition metal compound. The polymerization time can be varied as desired and will usually be of the order of from 30 minutes to several hours in batch processes, with periods of from 1 to 4 hours being commonly employed in autoclave type reactions. When a continuous process is employed, the contact time in the polymerization zone can also be regulated as desired. Ordinarily the reaction or contact time in such a continuous process can be about one-half to one hour with a cyclic system being employed whereby solid polymer formed during the reaction is continuously separated from the resulting mixture and the vehicle and unused catalyst are returned to the charging zone where the catalyst can be replenished and additional monomer introduced.

The organic vehicle employed can be an aliphatic alkane or cycloalkyl such as pentane, hexane, heptane, or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The preparation of typical polymeric organo metallic reaction products is illustrated by the following examples, although the invention is not limited to the specific embodiments therein set out.

*Example 1*

A reaction flask swept with nitrogen was charged with 101 g. of aluminum granules (4.0 moles, 20 mesh), a small crystal of iodine (or preferably a ml. of previously prepared polymeric reaction product) and about 50 cc. of methylene bromide was added. If the reaction did not begin after 20 to 40 minutes, it was heated on a steam bath to approximately 100° C. to start the reaction. When the reaction had begun, stirring was started, and additional methylene bromide was added over a 3-hour period to give a total of 523 g. of methylene bromide (3 moles). During this time, the reaction flask was surrounded by a water bath to dissipate the heat of reaction. When the addition was complete, the mixture was refluxed for 1 hour. The nondistillable polymeric residue solidified on cooling and can be used directly as a catalyst for polymerizations embodying the invention. Since the product was susceptible to atmospheric oxygen and moisture, it was protected from decomposition before and during use.

*Example 2*

A nondistillable polymeric solid was obtained in similar fashion by reacting 97 g. of magnesium metal turnings with 520 g. of methylene bromide.

Similarly, the zinc reaction product was prepared using the procedure described in Example 1 in reacting 262 g. of zinc powder with 520 g. of methylene bromide. In each case, the reaction product was a nondistillable polymeric solid.

The polymerization of α-olefins is illustrated by the following examples of certain preferred embodiments thereof, although it will be understood that the invention is not limited thereby unless otherwise specifically indicated.

*Example 3*

To a pressure reactor, flushed with dry nitrogen, were added 100 parts by volume of dry heptane, 1 part by weight of polymeric reaction product of aluminum and methylene bromide, and 1.6 parts by weight of titanium tetrachloride. This mixture, still under dry nitrogen, was attached to an ethylene source and agitated for a period of 3.5 hours under 30 p.s.i. ethylene pressure. The temperature during this time increased from room temperature to approximately 67° C. To the resulting reaction mixture was added 50 parts by volume of ethyl alcohol to dissolve the residual catalyst. The precipitated polyethylene was filtered, washed thoroughly with ethyl alcohol and then with water and dried in a circulating air oven. A yield of 32.7 parts by weight of polyethylene was obtained having an inherent viscosity of 1.5. This solid polyethylene had an average crystallinity of about 90% and contained less than one-half percent of chain branching. The density of the product was in excess of 0.945, and the softening temperature was above 130° C. The polymer was considerably less flexible than corresponding polyethylenes obtained by high pressure polymerization. The greater degree of rigidity and unusually high softening temperature made the polymer of exceptional utility for the preparation of articles for use in contact with boiling water and also for articles wherein a degree of rigidity is desirable. The tensile strength of the polymer was of the order of 3000–5500 p.s.i. and its stiffness in flexure at 5% deflection was above 50,000 p.s.i. The polymer molded readily and could be extruded to form sheets and films of excellent quality. Fibers extruded from the molten polymer showed excellent strength characteristics.

*Example 4*

Exceptionally good yields of solid high molecular weight, high density polyolefins are obtained with the polymeric aluminum reaction product catalysts. Nevertheless, the magnesium reaction products also form highly effective catalyst components. Thus, a mixture of 100 parts by volume of dry heptane, 1.3 parts by weight of the nondistillable polymeric reaction product of magnesium and methylene chloride, and 1.8 parts by weight of titanium tetrachloride was pressured with 30 p.s.i. of ethylene and the reaction allowed to proceed without heating to initiate. The reaction was carried out until the absorption of ethylene had stopped, which occurred after a reaction period of about 8 hours. The solid polymer was then precipitated by the addition of methyl alcohol, filtered off, washed with methanol and water and dried. The precipitated polyethylene was a white solid amounting to 25 parts by weight and having an inherent viscosity of 1.7. Similar results are obtained when titanium trichloride is substituted for titanium tetrachloride in this run.

*Example 5*

The process described in Example 3 was employed for polymerizing ethylene with a mixture of 3 parts by weight of the reaction product of zinc with methylene bromide and 1.8 parts by weight of titanium tetrachloride. The polyethylene thereby obtained amounted to 20 parts by weight of polymer having an inherent viscosity of 1.3. As in the preceding examples, a titanium halide of reduced valency can be substituted to give similar results and the polymer exhibits the high density and high crystallinity characteristic of the polymers prepared by the catalytic process embodying this invention.

*Example 6*

As has been indicated, the halides and alkoxides, particularly those in which the alkoxide groups contain 1 to 4 carbon atoms, are the preferred titanium compounds although other titanium compounds can be used with somewhat less effective results. Thus, a mixture of 100 ml. of dry heptane, 1.2 g. of the polymeric reaction product of aluminum and methylene bromide and 1.4 g. of titanium sesquioxide ($Ti_2O_3$) was used to polymerize ethylene at a pressure of 30 p.s.i. A short induction period was noted before the absorption of ethylene began, but the polymerization proceeded readily with a gradual increase in heat to about 60° C. After 5 hours reaction period, the yield of solid high density polyethylene was 15 g.

*Example 7*

The procedure of Example 3 was followed using a catalyst mixture of 1.2 parts by weight of aluminum-methylenebromide polymeric reaction products and 3.7 parts by weight of titanium tetrabutoxide. After a brief induction period, the reaction proceeded in the same manner as described in Example 3 to give solid high density polyethylene in a yield of 22 parts by weight of polymer having an inherent viscosity of 1.7.

*Example 8*

Propylene was polymerized in dry heptane containing 1.2% of aluminum-methylenebromide polymeric reaction product and 1.5% of a mixture of approximately equal amounts of titanium dioxide and titanium sesquioxide. The propylene pressure employed was 20 p.s.i. and the reaction time was 8 hours. The yield of solid white polypropylene was 15 parts by weight, and the polymer exhibited the high crystallinity, high density and high molecular weight characteristic of the catalytically prepared polyolefins.

*Example 9*

As already indicated, titanium is the preferred transition metal while the halides and alkoxides of this metal are the preferred compounds used in the catalyst compositions of this invention. However, compounds of zirconium, vanadium, chromium, molybdenum and tungsten also give good results. Thus, a pressure reactor was charged with 100 parts by volume of dry n-heptane, 1 part by weight of the polymeric reaction product from Example 1 and 1.4 parts by weight of vanadyl chloride ($VOCl_3$). The run was carried out as in Example 3. A yield of 27.6 parts by weight was obtained. The inherent viscosity of the product was 1.35. Similar results are obtained when chromyl chloride is used instead of vanadyl chloride.

*Example 10*

The procedure of Example 3 was followed, except that 2.9 parts of chromic acetylacetonate

was used instead of titanium tetrachloride, and toluene was used instead of n-heptane for the solvent. A yield of 29.1 g. of polyethylene was obtained. The inherent viscosity of this product was 2.8, and the density was 0.952. A similar result is obtained when vanadium acetylacetonate is used. When vanadyl acetylacetonate is used, the inherent viscosity of the product, 20.8 parts by weight, is 1.1, and the density was 0.958.

*Example 11*

The procedure of Example 3 was followed using a catalyst composed of 1.3 parts by weight of the polymeric magnesium-methylene bromide product from Example 2 with 1.8 parts of vanadium tetrachloride. A yield of 27 parts by weight of polyethylene was obtained. The inherent viscosity of this product was 1.5. When zirconium tetrachloride is used, a yield of 12 parts by weight is obtained. This product has an inherent viscosity of 1.9, and a density of 0.958.

*Example 12*

The procedure of Example 3 was used with a catalyst composed of 1.2 parts by weight of the polymeric product from Example 1 with 2.3 parts of molybdenum pentachloride. A yield of 11.6 parts of polyethylene was obtained. When the procedure was used at 95° C., the yield was increased to 21 parts of polymer having an inherent viscosity of 1.3. Similar results are obtained when 3.3 parts of tungsten hexachloride is used.

Example 13

A clean, dry, stainless steel autoclave was charged, in a nitrogen-filled drybox, with 1.3 g. of the polymeric aluminum-methylene bromide product and 2.0 g. chromic acetylacetonate dissolved in 10 ml. dry toluene. The autoclave was sealed, and 200 ml. of dry liquid propylene was added. The autoclave was heated to 85° C. and rocked at this temperature for six hours. The autoclave was cooled and vented, and the product was washed with boiling isobutanol. A yield of 87 g. of crystalline polypropylene was obtained. The inherent viscosity of this polymer was 2.4, and its density was 0.913. Similar results, but with I.V. lowered to 1.8, are obtained when vanadium acetylacetonate is employed.

In the same manner, high molecular weight polymers were obtained from 1-butene, 1-pentene and 1-hexene using the different catalyst mixtures herein described. The process embodying the invention was also effective for preparing copolymers of ethylene and propylene over the entire range of concentrations of the two monomers.

Similar results are obtained with other polymerization mixtures as described herein. The polymers thus obtained can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected within the spirit and scope of the invention as described hereinabove and as defined in the appended claims.

We claim:

1. In the polymerization of at least one α-monoolefinic hydrocarbon to form solid polymer, the improvement which comprises effecting the polymerization in the presence of a mixture of (1) a nondistillable polymeric solid resulting from reaction of methylene halide with a metal from the group consisting of aluminum, zinc and magnesium, and (2) a compound of the transition metal titanium.

2. In the polymerization of at least one α-monoolefinic hydrocarbon from the group consisting of ethylene and propylene to form solid polymer, the improvement which comprises effecting the polymerization in dispersion in an inert organic liquid vehicle and in the presence of a mixture of (1) a nondistillable polymeric solid reaction product of methylene halide and a metal from the group consisting of aluminum, zinc and magnesium, and (2) a compound of the transition metal titanium.

3. In the polymerization of at least one α-monoolefin from the group consisting of ethylene and propylene, to form solid polymer, the improvement which comprises effecting the polymerization in dispersion in an inert organic liquid at a temperature of from −60° C. to 130° C. and in the presence of a mixture of (1) a nondistillable polymeric solid methylene halide-aluminum reaction product and (2) titanium halide, the ratio of said polymeric reaction product to said titanium halide being in the range of from 1:4 to 16:1.

4. In the polymerization of at least one α-monoolefin from the group consisting of ethylene and propylene, to form solid polymer, the improvement which comprises effecting the polymerization in dispersion in an inert organic liquid at a temperature of from −60° C. to 130° C. and in the presence of a mixture of (1) a nondistillable polymeric solid methylene halide-aluminum reaction product and (2) titanium tetrahalide, the ratio of said polymeric reaction product to said titanium tetrahalide being in the range of from 1:4 to 16:1.

5. In the polymerization of at least one α-monoolefin from the group consisting of ethylene and propylene, to form solid polymer, the improvement which comprises effecting the polymerization in dispersion in an inert organic liquid at a temperature of from −60° C. to 130° C. and in the presence of a mixture of (1) a nondistillable polymeric solid methylene halide-aluminum reaction product (2) titanium oxide, the ratio of said polymeric reaction product to said titanium oxide being in the range of from 1:4 to 16:1.

6. In the polymerization of at least one α-monoolefin from the group consisting of ethylene and propylene, to form solid polymer, the improvement which comprises effecting the polymerization in dispersion in an inert organic liquid at a temperature of from −60° C. to 130° C. and in the presence of a mixture of (1) a nondistillable polymeric solid methylene halide-aluminum reaction product and (2) titanium tetraalkoxide wherein each alkoxide group contains 1–4 carbon atoms, the ratio of said polymeric reaction product to said titanium tetraalkoxide being in the range of from 1:4 to 16:1.

7. In the polymerization of at least one α-monoolefin from the group consisting of ethylene and propylene to form solid polymer, the improvement which comprises effecting the polymerization in an inert organic liquid at a temperature in the range from −60° C. to 130° C. and in the presence of a mixture of (1) a nondistillable polymeric solid methylene halide-zinc reaction product and (2) a titanium tetrahalide, the ratio of said polymeric reaction product to said titanium tetrahalide being in the range of from 1:4 to 16:1.

8. In the polymerization of at least one α-monoolefin from the group consisting of ethylene and propylene to form solid polymer, the improvement which comprises effecting the polymerization in dispersion in an inert organic liquid at a temperature in the range from −60° C. to 130° C. and in the presence of a mixture of (1) a nondistillable polymeric solid methylene halide-magnesium reaction product and (2) a titanium tetrahalide, the ratio of said polymeric reaction product to said titanium tetrahalide being in the range of from 1:4 to 16:1.

9. In the polymerization of at least one α-monoolefin from the group consisting of ethylene and propylene to form solid polymer, the improvement which comprises effecting the polymerization in dispersion in an inert liquid hydrocarbon at a temperature of from −20° C. to 80° C. and in the presence of a catalytic mixture of (1) a nondistillable polymeric solid methylene bromide-aluminum reaction product and (2) titanium tetrachloride, the ratio of said polymeric reaction product to said titanium tetrachloride being in the range of from 1:4 to 16:1.

10. In the polymerization of at least one α-monoolefin from the group consisting of ethylene and propylene to form solid polymer, the improvement which comprises effecting the polymerization in dispersion in an inert liquid hydrocarbon at a temperature of from −20° C. to 80° C. and in the presence of a catalytic mixture of (1) a nondistillable polymeric solid methylene chloride-magnesium reaction product and (2) titanium tetrachloride, the ratio of said polymeric reaction product to said titanium tetrachloride being in the range of from 1:4 to 16:1.

11. In the polymerization of at least one α-monoolefin from the group consisting of ethylene and propylene to form solid polymer, the improvement which comprises effecting the polymerization in dispersion in an inert liquid hydrocarbon at a temperature of from −20° C. to 80° C. and in the presence of a catalytic mixture of (1) a nondistillable polymeric solid methylene bromide-zinc reaction product and (2) titanium tetrachloride, the ratio of said polymeric reaction product to said titanium tetrachloride being in the range of from 1:4 to 16:1.

12. In the polymerization of at least one α-monoolefin from the group consisting of ethylene and propylene to form solid polymer, the improvement which comprises effecting the polymerization in dispersion in an inert liquid hydrocarbon at a temperature of from −20° C. to 80° C. and in the presence of a catalytic mixture of (1) a nondistillable polymeric solid methylene bromide-aluminum reaction product and (2) titanium tetrachloride, the ratio of said polymeric reaction product to said titanium tetrachloride being in the range of from 1:4 to 16:1.

13. As a catalyst for polymerization of α-monoolefins, a mixture of (1) the nondistillable polymeric solid reaction product of a methylene halide and a metal from the group consisting of aluminum, zinc and magnesium, and (2) a compound of the transition metal titanium, the ratio of said polymeric reaction product to said transition metal compound being in the range of from 1:4 to 16:1.

14. As a catalyst for polymerization of α-monoolefins, a mixture of (1) nondistillable polymeric solid methylene halide-aluminum reaction product and (2) titanium halide in a ratio of from 1:4 to 16:1.

15. As a catalyst for polymerization of α-monoolefins, a mixture of (1) nondistillable polymeric solid methylene halide-aluminum reaction product and (2) titanium tetrahalide in a ratio of from 1:4 to 16:1.

16. As a catalyst for polymerization of α-monoolefins, a mixture of (1) nondistillable polymeric solid methylene halide-aluminum reaction product and (2) titanium oxide in a ratio of from 1:4 to 16:1.

17. As a catalyst for polymerization of α-monoolefins, a mixture of (1) nondistillable polymeric solid methylene halide-aluminum reaction product and (2) titanium tetraalkoxide wherein each alkoxide group contains 1–4 carbon atoms, in a ratio of from 1:4 to 16:1.

18. As a catalyst for polymerization of α-monoolefins, a mixture of (1) nondistillable polymeric solid methylene halide-zinc reaction product and (2) titanium tetrachloride in a ratio of from 1:4 to 16:1.

19. As a catalyst for polymerization of α-monoolefins, a mixture of (1) nondistillable polymeric solid methylene halide-magnesium reaction product and (2) titanium tetrachloride in a ratio of from 1:4 to 16:1.

20. As a catalyst for polymerization of α-monoolefins, a mixture of (1) nondistillable polymeric solid methylene bromide-aluminum reaction product and (2) titanium tetrachloride in a ratio of from 1:4 to 16:1.

References Cited by the Examiner
UNITED STATES PATENTS

| | | | |
|---|---|---|---|
| 2,886,561 | 5/1959 | Reynolds et al. | 260—94.9 |
| 2,927,105 | 3/1960 | Nienburg et al. | 260—94.9 |
| 3,109,838 | 11/1963 | Chatt et al. | 260—94.9 |

JOSEPH L. SCHOFER, *Primary Examiner.*